United States Patent [19]
Takahashi

[11] Patent Number: 6,099,171
[45] Date of Patent: Aug. 8, 2000

[54] LENS-SHUTTER DEVICE

[75] Inventor: Shinya Takahashi, Hino, Japan

[73] Assignee: Olympus Optical Co., Ltd., Tokyo

[21] Appl. No.: 09/169,353

[22] Filed: Oct. 9, 1998

[30] Foreign Application Priority Data

Oct. 9, 1997 [JP] Japan ................................. 9-277586

[51] Int. Cl.$^7$ ................................................. G03B 17/24
[52] U.S. Cl. ........................... 396/451; 396/462; 396/497
[58] Field of Search ................................. 396/451, 462, 396/488, 493, 497, 487, 449

[56] References Cited

U.S. PATENT DOCUMENTS 5,381,200   1/1995   Takagai ........................... 396/6

FOREIGN PATENT DOCUMENTS 63-019636   1/1988   Japan .

Primary Examiner—David M. Gray
Attorney, Agent, or Firm—Louis Weinstein

[57] ABSTRACT

A lens-shutter device of the present invention includes main blades and sub blades which can rotate in the opening and closing directions within an inner space formed by a case and a case cover. When the shutter is closed, protrusions of the case cover disposed on a rotating path of the main blades and protrusions of the case disposed on the same path permit each blade to be maintained in a state where gaps are more even and much smaller. This enables a satisfactory shield condition to be obtained. Furthermore, in a traveling range from the closed state to the open state of the shutter, drive load of the main blades is reduced by being released from the protrusions to enable smooth opening and closing, which results in effective shielding and a lighter drive load.

19 Claims, 4 Drawing Sheets

LENS-SHUTTER DEVICE

BACKGROUND OF THE INVENTION

1. Field of the Invention

The present invention relates to a structure of a lens-shutter device incorporating a plurality of sectors.

2. Description of the Related Art

A conventional type of diaphragm for varying an aperture for photographic light transmission, which is incorporated into cameras and so forth, is disclosed in Japanese Unexamined Patent Publication No. 63-19636. Such a diaphragm is equipped with aperture blades that are disposed on the base in such a manner that they can slide, in which a lifting-prevention member for preventing the aperture blades from lifting from the base is disposed integrally with the base. The aperture blades slide, in the area in which a shutter of the device opens and closes, making linear contact with the lifting-prevention member. Such sliding enables satisfactory shielding to be obtained.

However, in the above-mentioned device, which is disclosed in Japanese Unexamined Patent Publication No. 63-19636, the aperture blades are arranged in a manner in which they slide making linear contact with the lifting-prevention member while an equal gap is maintained between them from the open state to the closed state of the aperture. As a result, in the opening and closing action of the shutter, a relatively large drive load is necessary. Thus, in the device disclosed above, there is no consideration for reduction in the drive load and for effective prevention of light from leaking in the closed state of the shutter.

As for a conventional type of shutter device operated by means of opening and closing an aperture through which photographic light passes, there is a lens-shutter device arranged with four blades. This type, with an increased number of blades, has smaller blades and a minimized projected area of the shutter.

Such a lens-shutter device arranged with four blades needs equal gaps between the blades in the direction of the optical axis depending on the number of blades, since it has multiple blades. Consequently, a relatively large gap may be created by an unbalanced leaning position of the four blades in the direction of the optical axis when the shutter is closed, and, thus, light easily leaks through the gap.

SUMMARY OF THE INVENTION

The present invention has been made with a view toward solving the above problems. Accordingly, it is an object of the present invention to provide a lens-shutter device arranged with multiple blades, which enables secured shielding and a reduction of drive load to be realized.

The lens-shutter device employed in the present invention has an aperture through which photographic light passes. In the device which operates by means of opening and closing of the aperture there are disposed two or more sectors to open and close the aperture, support members to form a space for accommodating the sectors so as to be capable of opening and closing, and protrusions positioned in the space and directed toward the sectors to control the gaps between the sectors in the direction of the optical axis when the sectors are closed or during the closing action; in the process of opening and closing of the sectors, halfway through the process, and immediately before or after the closed position, the sectors abut the protrusions, so that the gaps between the sectors can be controlled.

Other characteristics and advantages of the present invention will be apparent by reference to the following description.

DESCRIPTION OF THE PREFERRED EMBODIMENT

Figure 1:
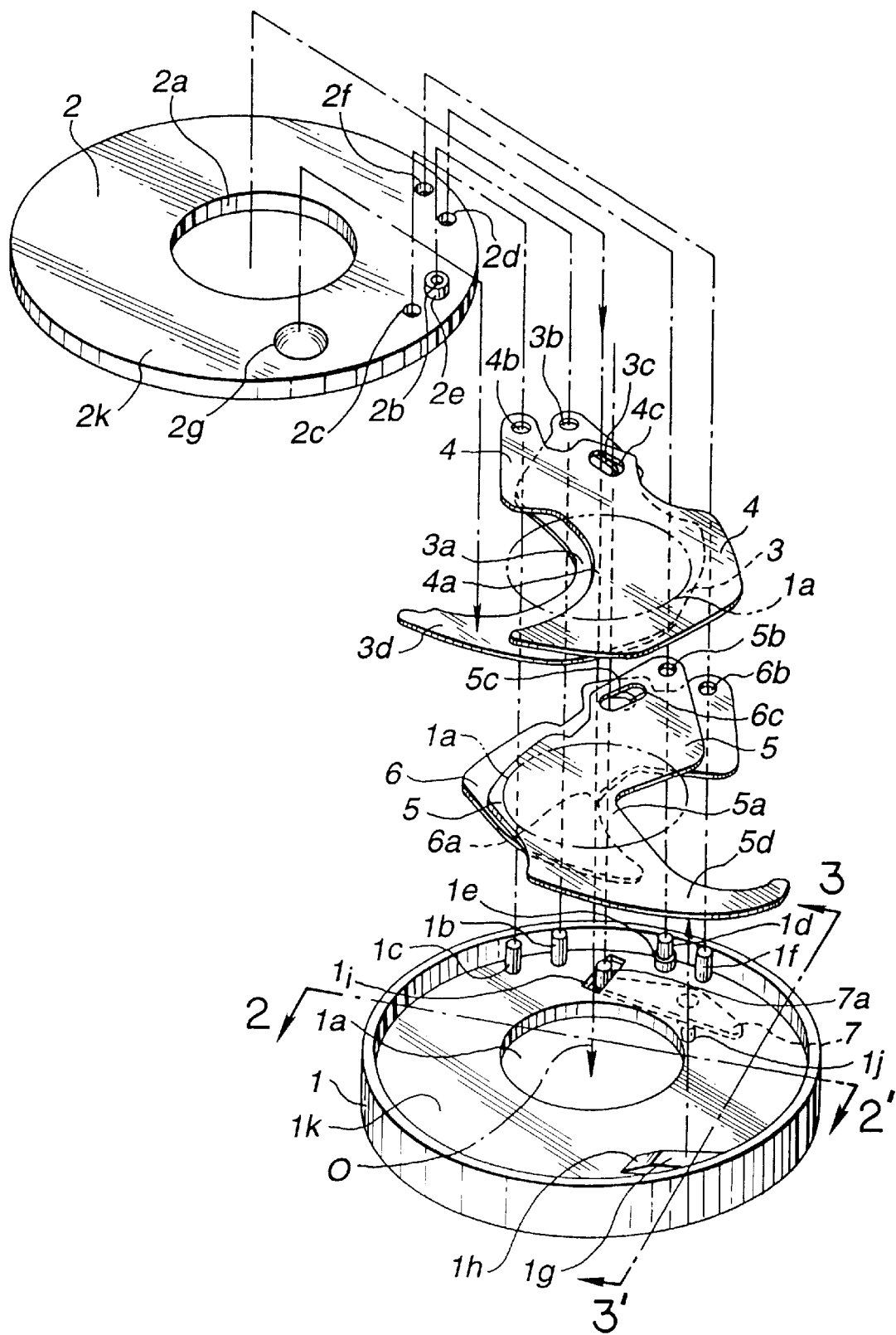
FIG. 1 is an exploded perspective view of a lens-shutter device according to an embodiment of the present invention.

Referring to the drawings, a description will be given of the embodiment of the present invention.

FIG. 1 shows an exploded perspective view of a lens-shutter device according to an embodiment of the present invention. The device employed here is a lens-shutter device which is incorporated into cameras and the like, mainly comprising a case 1 and a case cover 2 as support members, four sectors capable of rotating in the direction of opening and closing, namely, a pair consisting of a main blade 3 and a sub blade 4, and another pair consisting of a main blade 5 and a sub blade 6, and a drive lever 7 having a drive pin 7a.

In the case 1 there is: an inner surface 1k, which is perpendicular to an optical axis O and which forms a space for accommodating the sectors; an aperture 1a formed in the inner surface 1k; support pins 1b, 1c, 1d, and 1f rotatably supporting the sectors; a protrusion 1g, which is on the rotating path of an extension 5d to support the main blade 5 at the closed position; a hole 1i for inserting the drive pin 7a of the drive lever 7; and a lever support pin 1j rotatably supporting the drive lever 7. The support pin 1d has a step 1e for supporting the periphery of a rotation support hole 5b of the main blade 5 in the direction of an optical axis. The protrusion 1g has an inclined portion 1h.

In the case cover 2 there is: a surface 2k, which is perpendicular to the optical axis O and which forms a space for accommodating the sectors; an aperture 2a formed in the surface 2k; axis holes 2b, 2c, 2d, and 2f to respectively fit the support pins 1b, 1c, 1d, and 1f; and a spherical protrusion 2g, which is on the rotating path of an extension 3d of the main blade 3 that supports the main blade 3. The axis hole 2b is formed in a protrusion 2e for supporting the periphery of a rotation support hole 3b of the main blade 3 in the direction of the optical axis.

On the main blade 3 there is an aperture shielding portion 3a, a rotation support hole 3b to be rotatably fitted onto the support pin 1b, a long hole 3c to fit a drive pin 7a for rotating drive, and the extension 3d, which is located farther outward than the aperture shielding portion to extend in the direction of closing rotation. On the sub blade 4 there is an aperture shielding portion 4a, a rotation support hole 4b to be rotatably fitted onto the support pin 1c, and a long hole 4c to fit the drive pin 7a for rotating drive.

On the main blade 5 there is an aperture shielding portion 5a, a rotation support hole 5b to be rotatably fitted onto the support pin 1*b*, a long hole 5*c* to fit the drive pin 7*a* for rotating drive, and an extension 5*d*, which is located farther outward than the aperture shielding portion to extend in the direction of closing rotation. On the sub blade 6 there is an aperture shielding portion 6*a*, a rotation support hole 6*b* to be rotatably fitted onto the support pin 1*f*, and a long hole 6*c* to fit the drive pin 7*a* for rotation drive.

The drive lever 7 is rotatably supported by the case 1 and is biased by a biasing spring so as to close the shutter. The lever is rotatably driven by an actuator such as a plunger or the like when the shutter is opened or closed.

Figure 2:
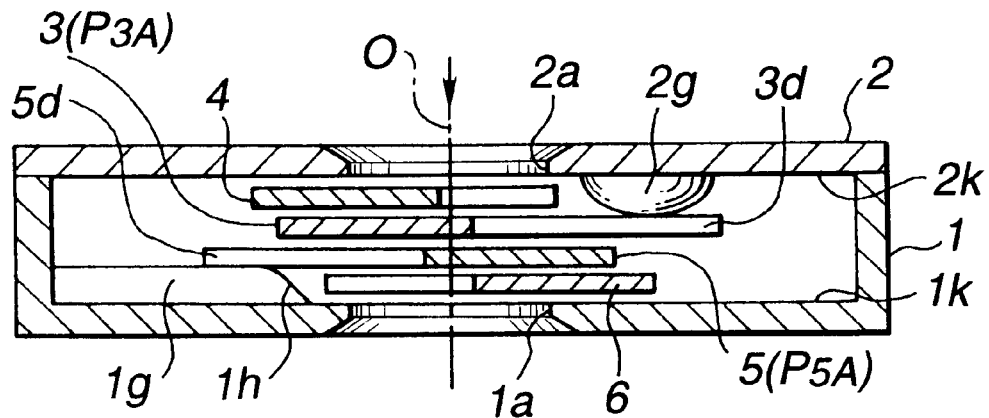
FIG. 2 is a sectional view taken along the line 2-2' of the lens-shutter device shown in FIG. 1 when the shutter is closed.
Figure 3:
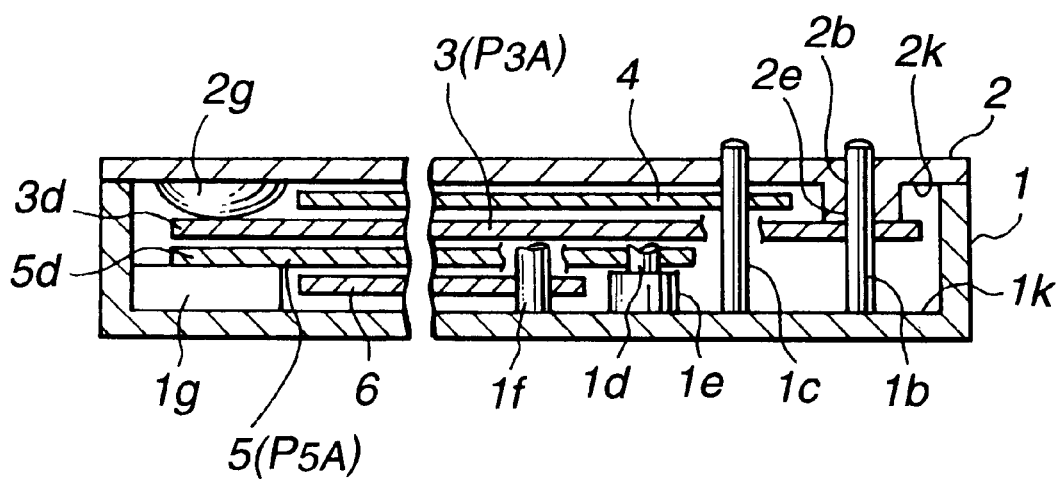
FIG. 3 is a schematic sectional view taken along the line 3-3' of the lens-shutter device shown in FIG. 1 when the shutter is closed.
Figure 4:
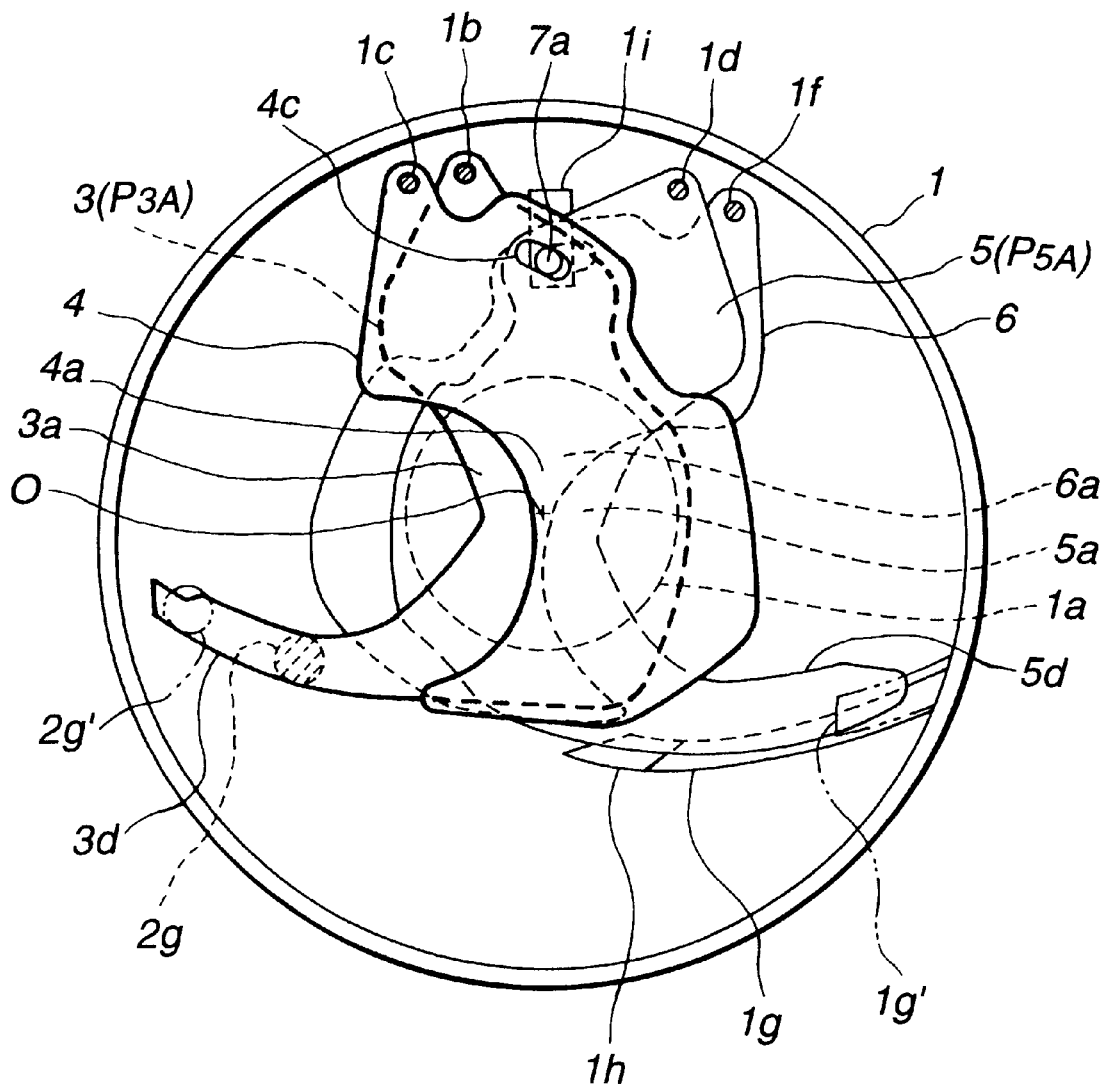
FIG. 4 is a plan view of the lens-shutter device shown in FIG. 1 when the case cover is removed.
Figure 5:
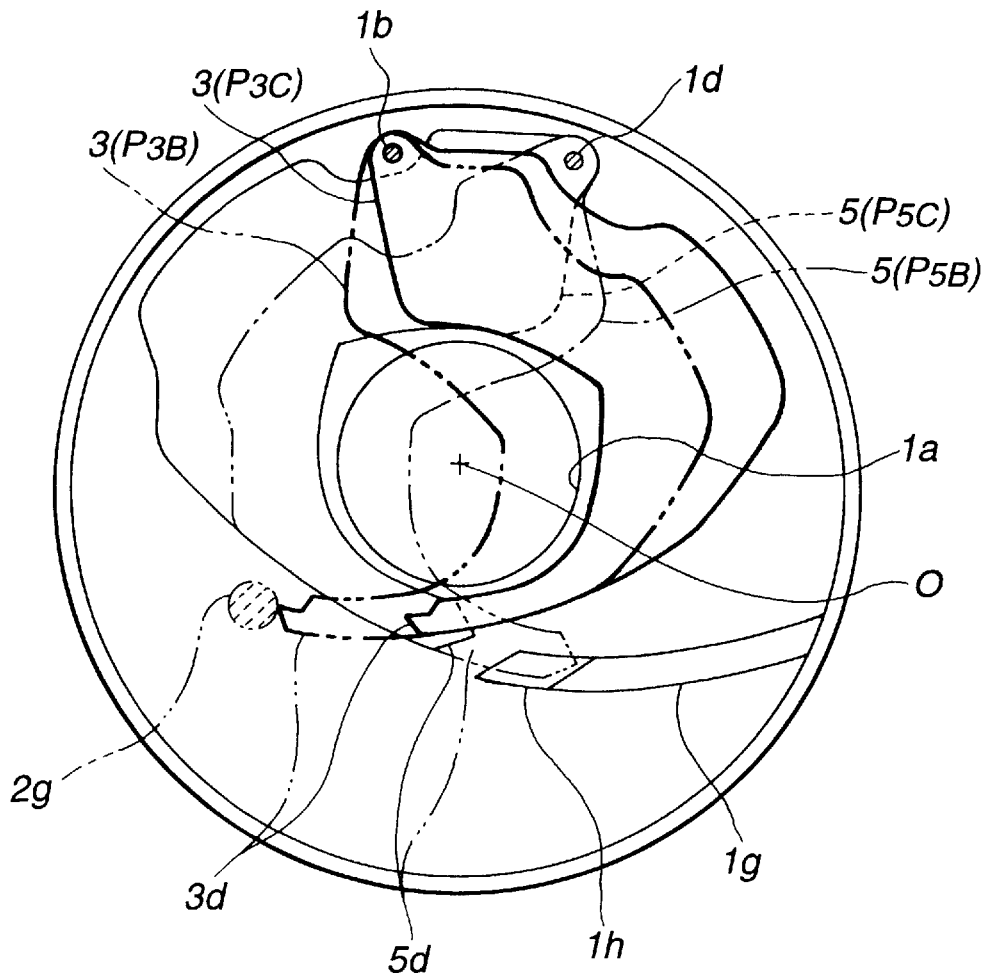
FIG. 5 is a plan view of the lens-shutter device when the case cover is removed and the shutter is open, only main blades being shown.

FIG. 2 shows a sectional view taken along the line 2-2' of the lens-shutter device of FIG. 1 when the shutter is closed. FIG. 3 shows a schematic sectional view taken along the line 3-3' of FIG. 1 when the shutter is similarly closed. FIG. 4 is a plan view of the device of FIG. 1 when the case cover is removed and the shutter is closed, and FIG. 5 is a plan view of the device when, similarly, the case cover is removed but the shutter is open, only main blades being shown.

As shown in FIGS. 2 and 3, in the inner space formed by the case 1 and the case cover 2, the four blades including the main and sub blades are rotatably fitted onto respective support pins 1*f*, 1*e*, 1*b*, and 1*c* in such a manner that they are stacked in the order of the blades 6, 5, 3, and 4 from the side of an aperture 1*a*.

The main blade 3 is arranged in such a way that the protrusion 2*e* with the axis hole 2*b* for the support pin keeps the hole 3*b* for rotation support and its periphery at a specific distance from the inner surface of the case cover 2 and, hence, constantly controls movement of the main blade 3 to the side of the sub blade 4. As shown in FIGS. 3 and 4, when the main blade 3 is in the closing position P3A, the protrusion 2*g* of the case cover 2 abuts with the extension 3*d* of the main blade 3, so that the extension 3*d* can be maintained at a specific distance from the inner surface of the case cover 2, and, thereby, movement of the main blade 3 to the side of the sub blade 4 is controlled.

The sub blade 4 is disposed in the space formed by the protrusion 2*e* with which the main blade 3 constantly abuts, the protrusion 2*g* with which the main blade 3 abuts when the shutter is closed, and the inner surface of the case cover 2. The space is narrow but is of a degree which ideally allows the sub blade 4 to rotate freely.

In a similar manner, the main blade 5 is arranged in such a way that the pin step 1*e* of the support pin keeps the periphery of the rotation support hole 5*b* at a specific distance from the inner surface of the case 1, and hence, constantly, movement of the main blade 5 to the side of the sub blade 6 is controlled. Also, as shown in FIGS. 3 and 4, when the main blade 5 is in a rotating position of the closed state P5A, the extension 5*d* of the main blade 5 abuts the protrusion 1*g* of the case 1. Thus, the extension 5*d* of the main blade 5 is maintained at a specific distance from the inner surface of the case 1 and the main blade 5 is controlled so that it does not move to the side of the sub blade 6.

The sub blade 6 is disposed in the space formed by the step 1*e* with which the sub blade 6 constantly abuts, the protrusion 1*g* with which it abuts when the shutter is closed, and the inner surface of the case 1. It is a narrow space but is of a degree which ideally allows the sub blade 5 to freely rotate.

The main blades 3 and 5 are, constantly, controlled and supported in a state in which the peripheries of the rotation support holes 3*b* and 5*b* exist in a gap d1 between the protrusion 2*e* of the axis hole and the step 1*e* of the support pin. When the main blades 3 and 5 are in rotating positions of closed states P3A and P5A, the extensions 3*d* and 5*d* of the main blades 3 and 5 abut the protrusions 2*g* and 1*g* respectively, and exist in a gap d2 between the protrusions 2*g* and 1*g*; thereby in this state, the main blades 3 and 5 are controlled. These gaps d1 and d2 are both arranged in a narrow space of a degree which is ideal for allowing the main blades 3 and 5 to rotate freely.

If the main blades 3 and 5, when the shutter is open, are respectively biased to the sub blades 4 and 6, and also the gap between the main blades 3 and 5 is expanded, this means that when it is closed, the protrusions 2*g* and 1*g* work in such a manner that they narrow the gap between the main blades 3 and 5.

As shown in FIG. 5, when the shutter is in an open state and a half-open state, the main blades 3 and 5 are respectively in open positions P3*c* and P5*c*, and half-open positions of P3B and P5B; the extensions 3*d* and 5*d* of the main blades 3 and 5 are separated from the protrusions 2*g* and 1*g*. As a result, the extensions 3*d* and 5*d* of the main blades 3 and 5 are in a state in which the control by the protrusions 2*g* and 1*g* in the direction of the optical axis is released.

A description will be given of opening and closing actions of the shutter employed in the lens-shutter device of the embodiment with the above-described structure.

When the shutter is closed, the main blades 3 and 5 are in the closing positions P3A and P5A. At this time, the sub blades 4 and 6 are in the closing positions and the aperture 1*a* is completely closed. In this state, the extensions 3*d* and 5*d* of the main blades 3 and 5 are maintained in such a manner that they go on top of the protrusions 2*g* and 1*g*, as shown in FIGS. 3 and 4. On the other hand, in the peripheries of the rotation support holes 3*b* and 5*b*, the protrusion 2*e* and the step 1*e* constantly control the position of the optical axis. Thus, the blades 3, 4, 5, and 6 are not biased and are respectively maintained in substantially equal and narrow gaps. Particularly, the space between the main blades 3 and 5 is maintained in an extremely narrow space, so that light can be prevented from leaking through the light-shielding portions 3*a*, 4*a*, 5*a*, and 6*a* of each of the blades.

When the shutter begins to open, the main blades 3 and 5, and the sub blades 4 and 6 respectively rotate in the opening direction. When the main blades 3 and 5 pass through the half-open positions P3B and P5B, which are close to the closed positions (see FIG. 5), the extensions 3*d* and 5*d* of the main blades 3 and 5 separate from the protrusions 2*g* and 1*g*, and subsequently, during the movement toward the open positions P3C and P5C, there is created a state in which there is no control by the protrusions 2*g* and 1*g* in the direction of the optical axis.

Accordingly, even though each blade, 3, 4, 5, and 6 is, as mentioned above, maintained with a mutually narrow gap between them in the closed state of the shutter, there is an increase in freedom of each blade, especially of the main blades in the direction of the optical axis, during the process of moving from the half-open position to the open position. As a result, the drive load during the opening process extremely decreases so as to be capable of obtaining a smooth driving condition. During the opening process, each blade is biased toward the optical axis so that a small amount of light may leak through a gap between the blades, since the extensions 3*d* and 5*d* of the main blades 3 and 5 are separated from the protrusions 2*g* and 1*g*. This happens, however, in the process of opening from the half-open state to the open state, and, thus, light leaking through the gap does not matter.

After achieving a state of opening the shutter, again, each blade rotates in the closing direction to pass through a process which is the reverse to that mentioned above, namely, the process from the open state to the half-open state; then, the main blades 3 and 5 rotate up to the closing positions P3A and P5A respectively, after the extensions 3d and 5d go on top of the protrusions 2g and 1g. At the same time, the sub blades 4 and 6 also rotate up to the closing positions respectively, so as to return to the above-mentioned state in which the shutter is closed.

As described above, the lens-shutter device of the embodiment of the present invention solves problems such as there being an action of a certain amount of relatively large load in the whole process of opening and closing and there being a failure in precisely preventing light from leaking when the shutter is closed. These are the problems which are impossible for the conventional device previously described to prevent effectively. Furthermore, when the shutter is in a half-open state, which is almost a closed state of the shutter, the control of the main blades in the position of the direction of the optical axis and release of the control are switched, so that each blade in a closed state of the shutter can be maintained effectively in the direction of the optical axis in the state of a minimized and equally spaced gap, which results in prevention of light leaking with reliability. Also, during the period between the beginning of releasing and the achieving of an open state, an extremely small amount of drive load permits each blade to travel smoothly so as to obtain a stable condition of traveling, resulting in a contribution to the enhancement of the speed performance per second of the shutter.

The following description refers to a modified embodiment of the lens-shutter device mentioned above, in which a case and protrusions of a case cover are respectively arranged at ends of the closing direction in the rotating range of the main blades.

In a device of the modified embodiment there is a protrusion 1g' of the case 1 and a protrusion 2g' of the case 2 in a closed state of the shutter, as shown in the plan view of FIG. 4, which are to be arranged at ends in the rotating range. According to the device, the extensions 3d and 5d of the main blades 3 and 5 abut the protrusions 2g' and 1g' only when the main blades 3 and 5 are in a completely closed position or are in a position very close to this position. At this time, movement of the main blades in the direction of the optical axis is controlled. In rotating positions for the blades except when they are in the above positions, the extensions 3d and 5d separate from the protrusions 2g' and 1g', with the result of releasing the control of the main blades in the direction of the optical axis by the protrusions.

Accordingly, in the lens-shutter device of the modified embodiment, stable moving of the blades under a light drive load is obtainable, since the main blades 3 and 5 rotate in a relatively free state during almost all the period of exposure and opening except the short period of time for closing, in the process of opening and closing actions by the shutter. Moreover, when the shutter is closed, the extensions 3d and 5d abut the protrusions 2g' and 1g', so that the closed state in which there is no light leaking from a light-tight portion of the blades is obtainable as in the case of the lens-shutter device of the embodiment described first.

The positions at which the protrusions are arranged in the lens-shutter device of the embodiment of the present invention are not limited to those given in the embodiment. Other options are available. The protrusions can be arranged, as required, in appropriate positions with considerations of modifications of main blades, load fluctuation, or the like, without departing from the spirit and scope of the present invention.

In the above embodiment, the shape of the protrusions on the case is different from that on the case cover. However, they do not necessarily have to be different from each other. Protrusions having the same shape may be arranged on both the case and the case cover; the shape may be spherical or protruded with an inclined portion.

Figure 6:
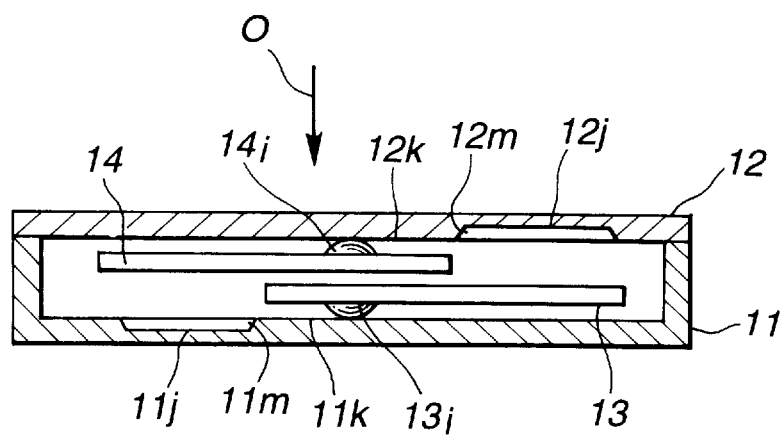
FIG. 6 is a sectional view of the sectors and their periphery when the shutter is closed, in a modification of the lens-shutter device of the embodiment above.

It is also possible to adopt a modification with a structure in which the protrusions are arranged not on the case but on the sectors. FIG. 6 is a sectional view of the sectors and the peripheral structure of a lens-shutter device employed in the modification above when the shutter is closed. In this state shown, protrusions 13i and 14i arranged on sectors 13 and 14 can abut inner surfaces 11k and 12k, which are protruded flat surfaces of a case 11 and a case cover 12 serving as support members, when the sectors are in the closing positions. In the closed state, and during the process of movement from the closed state to the open state, the positions of the sectors 13 and 14 in the direction of the optical axis O are maintained in a more controlled state. On the other hand, when the sectors 13 and 14 move to the open position, the protrusions 13i and 14i of the sectors 13 and 14 pass steps 11m and 12m to oppose 11j and 12j, which are recessed clearance portions respectively arranged on the inner surfaces of the case 11 and the case cover 12, resulting in maintaining the position of the sectors in the direction of the optical axis O in a more released state.

The device according to the above embodiment employs a structure with four sectors. However, this should not be construed restrictively. For example, the present invention is applicable to a lens-shutter device with a structure of two blades.

What is claimed is:

1. A lens-shutter device equipped with an aperture for transmitting photographic light and adapted to open and close the aperture, comprising:

two or more sectors for opening and closing said aperture;

support members being spaced apart for forming a space therebetween for accommodating said sectors in such a manner that they can move between open and closed positions; and protrusions provided on said support member, extending into said space and directed toward said sectors and slidably engaging said sectors during only a portion of their movement between the open and closed positions in such a manner that a gap between said sectors in a direction of an optical axis is controlled, when said sectors are closed, or during their movement in the closing direction.

2. A lens-shutter device as stated in claim 1, wherein said protrusions are arranged on said support members and formed in such a manner that they protrude in the direction of the optical axis.

3. A lens-shutter device as stated in claim 2, wherein said space is formed by two flat surfaces perpendicular to the optical axis in such a manner that said sectors accommodated in said support members are sandwiched in the direction of the optical axis, and said protrusions are formed at least on one of the two flat surfaces.

4. A lens-shutter device as stated in claim 1, wherein at least two of said sectors are rotatable and are arranged so as to abut two of the sectors which are disposed in middle positions among said stacked sectors.

5. A lens-shutter device as stated in claim 1, wherein said protrusions have one of a spherical shape and a trapezoidal shape with an inclined portion along which one of said sectors slides during a portion of its movement.

6. A lens-shutter device equipped with an aperture for transmitting photographic light and adapted to open and close the aperture, comprising:

two or more sectors for opening and closing said aperture;

support members forming a space for accommodating said sectors in such a manner that they can open and close;

protrusions disposed in said space and formed to be directed toward said sectors in such a manner that a gap between said sectors in a direction of an optical axis is controlled, when said sectors are closed, or during their movement in the closing direction; and said protrusions being arranged to abut said sectors only when said sectors are in the closed state in which said aperture is closed.

7. A lens-shutter device as stated in claim 1, wherein a gap between at least two of said sectors becomes smaller when they are closed than when they are open.

8. A lens-shutter device equipped with an aperture for transmitting photographic light and adapted to open and close the aperture, comprising:

two or more sectors for opening and closing said aperture;

support members forming a space for accommodating said sectors in such a manner that they can open and close;

protrusions disposed in said space and formed to be directed toward said sectors in such a manner that a gap between said sectors in a direction of an optical axis is controlled, when said sectors are closed, or during their movement in the closing direction; and said support members having first surfaces which said protrusions abut when said sectors are in the closed state in which said aperture is closed, and second surfaces formed by recessing surfaces opposing said protrusions with respect to said first surfaces when said sectors are in an open state in which said aperture is open.

9. A lens-shutter device equipped with an aperture for transmitting photographic light and adapted to opened and close the aperture, comprising:

two or more sectors for opening and closing said aperture;

support members forming a space for accommodating said sectors in such a manner that they can open and close;

protrusions disposed in said space and formed to be directed toward said sectors in such a manner that a gap between said sectors in a direction of an optical axis is controlled, when said sectors are closed, or during their movement in the closing direction; and said support members having flat surfaces which said protrusions abut when said sectors are in the open state in which said aperture is open, and protruded portions in which surfaces opposing said protrusions are protruded with respect to said flat surfaces when said sectors are in the closed state in which said aperture is closed.

10. A lens-shutter device equipped with an aperture for transmitting photographic light and adapted to open and close the aperture, comprising:

two or more sectors for opening and closing said aperture;

support members forming a space for accommodating said sectors in such a manner that they can open and close;

protrusions disposed in said space and formed to be directed toward said sectors in such a manner that a gap between said sectors in a direction of an optical axis is controlled, when said sectors are closed, or during their movement in the closing direction; and said protrusions are arranged to abut said sectors when said sectors are in a closed state in which said aperture is closed, while said protrusions are arranged so that they do not abut said sectors when said sectors are in an open state in which said aperture is open.

11. A lens-shutter device equipped with an aperture for transmitting photographic light and adapted to open and close the aperture, comprising:

two or more sectors for opening and closing said aperture;

support members forming a space for accommodating said sectors in such a manner that they can open and close; and protrusions disposed on said sectors and directed toward said support members in such a manner that a gap between said sectors in a direction of an optical axis is controlled, when said sectors are closed, or during their movement in a closing direction.

12. A lens-shutter device as stated in claim 11, wherein said two or more sectors can rotate and are arranged in a stacked manner, and said protrusions disposed on said sectors are arranged in such a manner that they can abut said support members.

13. A lens-shutter device as stated in claim 11, wherein a gap between at least two of said sectors becomes smaller in a closed state than in an open state.

14. A lens-shutter device as stated in claim 11, wherein said support members have first surfaces which said protrusions abut when said sectors are in a closed state in which said aperture is closed, and second surfaces formed by recessing surfaces opposing said protrusions with respect to said first surfaces, when said sectors are in an open state in which said aperture is open.

15. A lens-shutter device as stated in claim 11, wherein said support members have flat surfaces which said protrusions abut when said sectors are in an open state in which said aperture is open, and protruded portions formed by protruding surfaces opposing said protrusions with respect to said flat surfaces when said sectors are in a closed state in which said aperture is closed.

16. A lens-shutter device equipped with an aperture for transmitting photographic light and adapted to open and close the aperture, comprising:

sectors including two main blades and two sub blades for opening and closing said aperture;

support members forming a space for accommodating said sectors in such a manner that they can open and close; and protrusions disposed in said space and directed toward said main blades so as to be capable of abutting only said main blades, in such a manner that a gap between said sectors in the direction of an optical axis is controlled when said sectors are closed or during their movement in a closing direction.

17. A lens-shutter device as stated in claim 16, wherein said protrusions are arranged in such a position that they can abut said main blades when said sectors are in a closed state in which said aperture is closed, while said protrusions are arranged in such a manner that they do not abut said main blades when said sectors are in an open state in which said aperture is open.

18. A lens-shutter device as stated in claim 16, wherein gaps between said sectors become smaller in a closed state than in an open state.

19. A lens shutter device as stated in claim 1, wherein said protrusions have a trapezoidal shape with an inclined portion along which one of said sectors slides during a portion of its movement.

* * * * *